United States Patent
De Matos Pereira Vieira

(10) Patent No.: US 9,983,408 B2
(45) Date of Patent: May 29, 2018

(54) DISPLAY DEVICE

(71) Applicant: Lusospace, Projectos Engenharia LDA, Lisbon (PT)

(72) Inventor: Ivo Yves De Matos Pereira Vieira, Lisbon (PT)

(73) Assignee: Lusospace, Projectos Engenharia LDA, Lisbon (PT)

( * ) Notice: Subject to any disclaimer, the term of this patent is extended or adjusted under 35 U.S.C. 154(b) by 0 days. days.

(21) Appl. No.: 14/779,768

(22) PCT Filed: Mar. 26, 2013

(86) PCT No.: PCT/EP2013/000906
§ 371 (c)(1),
(2) Date: Sep. 24, 2015

(87) PCT Pub. No.: WO2014/154225
PCT Pub. Date: Oct. 2, 2014

(65) Prior Publication Data
US 2016/0048018 A1    Feb. 18, 2016

(51) Int. Cl.
*G02B 27/01*    (2006.01)
*G02B 27/10*    (2006.01)
(Continued)

(52) U.S. Cl.
CPC ..... *G02B 27/0103* (2013.01); *G02B 27/0081* (2013.01); *G02B 27/0149* (2013.01);
(Continued)

(58) Field of Classification Search
None
See application file for complete search history.

(56) References Cited

U.S. PATENT DOCUMENTS 4,889,780 A * 12/1989 Cosner ............... G02B 27/0103
353/14
5,589,956 A    12/1996 Morishima et al.
(Continued)

FOREIGN PATENT DOCUMENTS

FR    2722582 A1 *  1/1996 ............. G02B 27/01
JP    6-51239 A    2/1994
(Continued)

OTHER PUBLICATIONS

Amitai, Yaakov, Lumus Ltd, "P-27: A Two-Dimensional Aperture Expander for Ultra-Compact, High-Perfonnrance Head-Worn Displays", 2005 SID International Symposium, Boston, MA, SID, vol. 36, May 24, 2005, pp. 360-363.
(Continued)

*Primary Examiner* — Edward Glick
*Assistant Examiner* — Anthony G Quash
(74) *Attorney, Agent, or Firm* — Robert R. Deleault, Esq.; Mesmer & Deleault, PLLC

(57) ABSTRACT

A display device 10 comprises a see-through member 12 having a see-through area 14, the see-through member 12 including a plurality of display segments 16 for emitting visible light, the display segments 16 being provided within the see-through area 14 in a mutually spaced manner, the see-through member 12 further including a plurality of holographic optical elements 20 provided within the see-through area 14, each holographic optical element 20 being associated with a respective display segment 16, wherein each holographic optical element 20 is adapted to collimate the visible light emitted by the associated display segment 16 when the display segment 16 is located in a focal plane of the associated holographic optical element 20.

8 Claims, 7 Drawing Sheets

Figure 1:
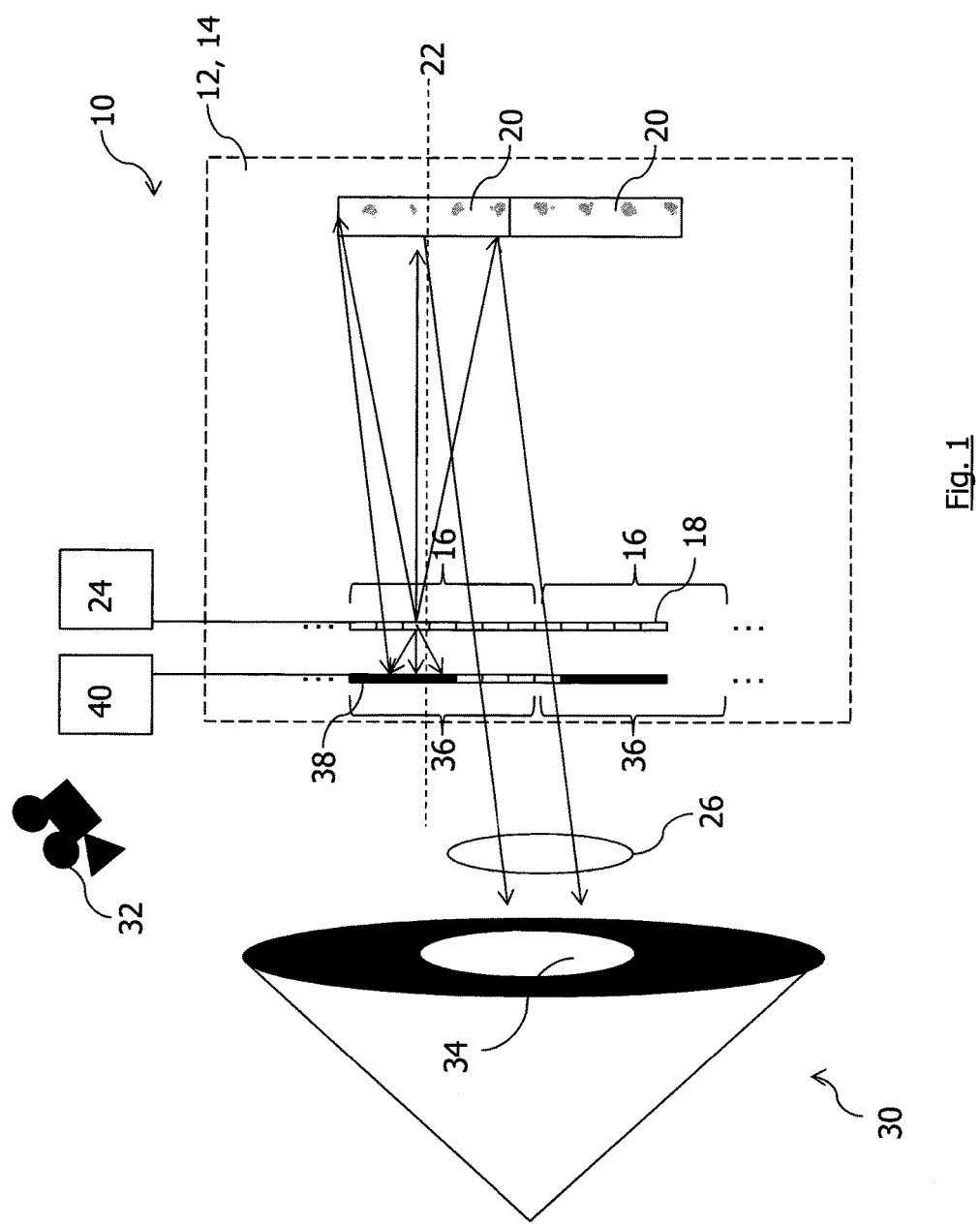

(51) Int. Cl.
*G02B 27/00* (2006.01)
*H04N 13/04* (2006.01)
*G09G 3/36* (2006.01)
*G02B 5/32* (2006.01)

(52) U.S. Cl.
CPC ..... *G02B 27/0172* (2013.01); *G02B 27/1066* (2013.01); *G09G 3/36* (2013.01); *H04N 13/044* (2013.01); *H04N 13/0484* (2013.01); *G02B 5/32* (2013.01); *G02B 2027/0125* (2013.01); *G02B 2027/0138* (2013.01); *G02B 2027/0152* (2013.01); *G02B 2027/0159* (2013.01)

(56) References Cited

U.S. PATENT DOCUMENTS

| | | | | |
|---|---|---|---|---|
| 6,057,966 | A * | 5/2000 | Carroll | G02B 27/0172 345/8 |
| 6,637,883 | B1 | 10/2003 | Tengshe et al. | |
| 2004/0108971 | A1* | 6/2004 | Waldern | G02B 27/0093 345/8 |
| 2005/0231599 | A1* | 10/2005 | Yamasaki | G02B 3/14 348/207.99 |
| 2005/0270432 | A1 | 12/2005 | Overline | |
| 2006/0227067 | A1 | 10/2006 | Iwasaki | |
| 2007/0002412 | A1 | 1/2007 | Aihara | |
| 2008/0151185 | A1* | 6/2008 | Saito | A61B 3/12 351/206 |
| 2008/0198471 | A1 | 8/2008 | Amitai | |

FOREIGN PATENT DOCUMENTS

| | | | | |
|---|---|---|---|---|
| JP | 2000-506998 A | 6/2000 | | |
| JP | 2005-030843 A | 10/2005 | | |
| JP | 2006-292883 A | 10/2006 | | |
| JP | 2011-075956 A | 4/2011 | | |
| JP | 2011075956 A * | 4/2011 | | G02B 27/0075 |
| WO | 89/03059 A2 | 4/1989 | | |
| WO | WO 8903059 A2 * | 4/1989 | | G02B 27/01 |
| WO | 97/35223 | 9/1997 | | |
| WO | 2006/013565 A1 | 2/2006 | | |
| WO | WO 2006013565 A1 * | 2/2006 | | G02B 6/0028 |
| WO | 2006/044298 A1 | 4/2006 | | |

OTHER PUBLICATIONS

PCT Search Report and Written Opinion, PCT/EP2013/000906, dated Apr. 24, 2014.
Japanese office action translation in counterpart JP 2016-504494, dated Jul. 4, 2017.
Chinese office action translation in counterpart CN 201380075059.0, dated Mar. 31, 2017.
Japanese office action translation in counterpart JP 2016-504494, dated Oct. 25, 2016.

* cited by examiner

DISPLAY DEVICE

The present invention relates to a display device.

A display device can be a see-through display device, a head mounted display device, a see-through head mounted display device, a helmet mounted display device, a see-through helmet mounted display device, a head-up display device and/or a see-through head-up display device. The display device, in particular a head-up display device can be implemented in the windshield of a vehicle, such as a car.

Such display devices can be used for creating an augmented reality vision, i.e. for superimposing images of both a physical world and of a display in a user's view. During the proper use of a display device, it is thus possible that beside an image of the physical world passing through the display device an additional superimposed image of the display representing overlay information reaches the user's eye(s).

To allow the user accommodating his/her vision to both the superimposed images, an optical system of the display device can be adapted to magnify the image of the display and to (virtually) project it to infinity. For example: The image of the display device can be represented by collimated visible light leaving the display device in the direction of the user's eye(s), where it is focused by the human lens, which is accommodated to infinity, on the retina. In this sense, it is understood that collimating visible light emitted by the display means creating an image of the display at infinite distance. Alternatively, the optical system of the display device can be adapted to (virtually) image the image of the display device on a certain plane for creating a virtual image. This is useful when the human eye is not focused to infinity but, for example, to an object in the real world situated in a plane corresponding to the plane of the virtual image.

In commonly known display devices, especially in commonly known see-through display devices, the display is decoupled from a see-through member of display device. This design is necessary, because the displays in commonly known display devices are not transparent for visible light. Thus the display has to be removed out of the line of sight or out of the field of view of the user using the display device.

A problem of this approach, however, is that the visible light representing the image of the display, before being directed into the user's eye by the optical system, has to be conveyed into the line of sight or the field of view of the user by an additional conveying optical system. This additional conveying optical system, in turn, increases the weight and the size of the display device.

It is one object of embodiments of the present invention to provide a display device of a lightweight and compact design.

This object is solved by a display device according to claim 1.

The display device comprises a see-through member having a see-through area. The see-through member includes a plurality of display segments. Each display segment is adapted to emit visible light. The plurality of display segments is provided within the see-through area in a mutually spaced manner.

For example, the plurality of display segments may be provided within the see-through area in a mutually spaced manner such that the see-through area includes a see-through zone between each pair of adjacent display segments. The see-through zone allows visible light to pass through the see-through member.

Alternatively or additionally, the display segments may be transparent or substantially transparent for visible light, for example, by forming the display segments by use of transparent organic light emitting diodes (OLEDs) and/or transparent transistors. The transparent or substantially transparent display segments allow visible light to pass through the see-through member.

The see-through member further includes a plurality of holographic optical elements provided within the see-through area. Each holographic optical element is associated with a respective display segment. Each display segment may be located in a focal plane of the associated holographic optical element. In general, each holographic optical element may be adapted to deflect (i.e. to reflect, to refract, to re-direct or the like) the visible light emitted by the associated display segment. In particular, each holographic optical element may be adapted to collimate the visible light emitted by the associated display segment when the display segment is located in a focal plane of the associated holographic optical element. The plurality of holographic optical elements may represent the collimating optical system of the display device.

As a consequence of the see-through zone between each pair of adjacent display segments allowing visible light to pass through the see-through member and/or the (substantial) transparence of the display segments, visible light can pass between each pair of adjacent display segments via the see-through zone and/or the display segments themselves. As the plurality of the display segments form the display of the display device, both visible light emitted by the display itself and visible light from the physical world can pass through the display. Hence, the display is transparent or at least semi-transparent. Therefore, it is possible to provide the display directly in the line of sight or in the field of view of the user, who uses the display device. Only the plurality of holographic optical elements is mandatory, however, an additional conveying optical system for conveying visible light emitted by the display into the line of sight or the field of view is dispensable. This, in turn, allows a lightweight and compact design of the display device.

Each display segment may include a plurality of transparent or substantially transparent display pixel units. In particular, each display pixel unit may be adapted to be transparent or substantially transparent for visible light. This allows realizing the display segments transparent or substantially transparent. Each display pixel unit may be adapted to emit visible light in an on-state and to emit no visible light in an off-state. For example, each display pixel unit may be an OLED. The plurality of pixel units may be employed to realize that the display segment comprising the pixel units is adapted to emit, for example, visible light only within a specific monochromatic emission spectrum. The display pixel units may be provided in a mutually spaced manner such that the display pixel units are arranged at different distances from an optical axis of the holographic optical element associated with the display segment. For example, the display pixel units may be provided equidistantly along a straight line or within a plane. The display pixel units of a display segment, which are in their on-state at a specific time, form a display image on the display segment. This allows realizing each display segment as a micro display for displaying a display image.

The display device may comprise a display segment controller for controlling the on- and off-states of the display pixel units of each display segment to display a display image on the display segment. In particular, the display segment controller may be adapted to display the display image in a first display image position or in a second display image position. The first display image position may differ from the second display image position, i.e. the second display image position may be spatially shifted from the first display image position. More particular, the display segment controller may be adapted to display the display image in a first display image position or in a second display image position spatially shifted from the first display image position such that the visible light of the display image in the first display image position is deflected by the holographic optical element associated with the display segment to pass through a first exit pupil and the visible light of the display image in the second display image position is deflected by the holographic optical element associated with the display segment to pass through a second exit pupil. The position of the center of the second exit pupil may be spatially shifted with respect to the position of the center of the first exit pupil. The size of the second exit pupil may be larger or smaller with respect to the size of the first exit pupil. Of course, the display segment controller may be adapted to display the display image in any plurality of first and/or second display image positions corresponding to an arbitrarily fine resolved spatial moving or shifting of the display image within the display area of the display segment in a direction away from or towards to the optical axis of the holographic optical element associated with the display segment. In other words: The display segment controller can be adapted to adjust the position of an exit pupil, through which the visible light emitted by the display pixel units in (all) the display segments are leaving the display device in the direction to the user's eye. This allows setting the position of the exit pupil of the display device to an arbitrary predetermined position. Or in still other words: The display segment controller can change the display segment from displaying the display image in the first display image position to displaying the display image in the second display image position, thereby moving (i.e. spatially shifting) the display image within the display area of the display segment. This allows moving the display image with respect to the holographic optical element associated with the display segment.

The display device may comprise an image capturing device for capturing an image of a pupil of a user's eye and for generating a position signal representing a position of the pupil of the user's eye. Therefore, the image capturing device allows tracking the position of the pupil of the user's eye. In this sense, the image capturing device can be regarded as an eye tracker. The image capturing device can be a stand-alone micro camera located on the side of the display device or can be embedded in the display device itself.

The display segment controller may be adapted to display the display image in each display segment in a display image position based on the position signal generated by the image capturing device such that the visible light of the display image in this display image position is deflected by the holographic optical element associated with the display segment to pass through an exit pupil, the position of which coincides with the position of the pupil of the user's eye. This allows setting the position of the exit pupil, through which the visible light emitted by the display pixel units in the display segments are leaving the display device in the direction to the user's eye, to the position of the pupil of the user's eye. One further advantage of this concept is that the user's eye receives at any time the visible light emitted by the display segments even when moving. Another advantage of this concept is that the setting the position of the exit pupil to the position of the pupil of the user's eye does not require any mechanically moving parts, but is controlled electronically/optically.

The display device may comprise a plurality of liquid crystal display (LCD) segments. Each LCD segment may be associated with a respective display segment. Each LCD segment may include a plurality of LCD pixel units. In particular, each LCD pixel unit of an LCD segment may be opaque or substantially opaque for visible light emitted by the associated display segment in an on-state and transparent or substantially transparent for visible light emitted by the associated display segment in an off-state. More particular, each LCD pixel unit of an LCD segment may be opaque or substantially opaque only for light emitted by the associated display segment in an on-state and transparent or substantially transparent for visible light in the off-state. The LCD pixel units may be provided in a mutually spaced manner such that the LCD pixel units are arranged at different distances from the optical axis of the holographic optical element associated with the LCD segment. For example, the LCD pixel units may be provided equidistantly along a straight line or within a plane. The LCD pixel units of an LCD segment, which are in their on-state at a specific time, form an LCD image on the LCD segment. This allows realizing each LCD segment as a micro LCD for displaying an LCD image. Therefore, the LCD segments can be used to shape arbitrarily formed masks absorbing visible light.

The display device may comprise an LCD segment controller for controlling the on- and off-states of the LCD pixel units of each LCD segment to display an LCD image on the LCD segment based on the position signal generated by the image capturing device. In particular, the LCD segment controller may be adapted to display the LCD image in a first LCD image position or in a second LCD image position spatially shifted from the first LCD image position. More particular, the LCD segment controller may be adapted to display the LCD image in a first LCD image position or in a second LCD image position spatially shifted from the first LCD image position such that the LCD image in the first LCD image position absorbs visible light of a display image of the associated display segment in a first display image position to prevented the visible light from directly passing from the display segment through a first exit pupil and such that the LCD image in the second LCD image position absorbs visible light of the display image of the associated display segment in a second display image position to prevented the visible light from directly passing from the display segment through a second exit pupil. Of course, the LCD segment controller may be adapted to display the LCD image in any plurality of first and/or second LCD image positions corresponding to an arbitrarily fine resolved spatial moving or shifting of the LCD image within the display area of the LCD segment in a direction away from or towards to the optical axis of the holographic optical element associated with the display segment. In other words: The LCD segment controller can be adapted to associate to each display image position of a display image displayed by the display segment with a respective LCD image position of an LCD image displayed by the LCD segment. This allows for realizing for each display segment a spatially variable and arbitrarily shaped mask such that the display segment is prevented from directly emitting visible light towards the user's eye.

The display device may comprise an actuator for shifting the plurality of display segments in a direction away from or towards to the plurality of holographic optical elements. The display device may further comprise an actuator controller for controlling the actuator such that the position of a virtual image created by the visible light emitted by the display segments is adjustable with respect to a position of the position of a user's eye. This allows arranging the plurality of display segments as a whole in the focal planes of the holographic optical elements. Therefore, it is possible to change the distance between the plurality of display segments and the plurality of holographic optical elements. Consequently, it is possible to change the focus plane of the virtual images created by the display segments and the holographic optical elements. For example, it is possible to adjust the position of a virtual image such that in the case of creating 3D images by employing a vergence of the user's two eyes brain stress is avoided and the observing comfort of user is enhanced. If the display device also comprises an eye tracking system such as the image capture device, the actuator controller may be adapted to adjust the position of the virtual image for the respective virtual zone that is being observed by the user. The peripheral view of the user does not need to be focused on the right plane distance. An actuator may be a linear actuator.

Additionally or alternatively, the display device may comprise a plurality of actuators, each actuator being associated with a respective display segment for shifting the display segment in a direction away from or towards to the holographic optical element associated with the display segment. The display device may further comprise a controller for controlling the plurality of actuators such that the position of a virtual image created by the visible light emitted by each display segment is adjustable individually with respect to a user's eye. This allows arranging each display segment in the focal plane of the associated holographic optical element individually. Therefore, it is possible to change the distance between each display segment and its respective holographic optical element separately. Consequently, it is possible to create a virtual image having a specific depth of field.

The display device may comprise a beam expansion unit. The beam expansion unit may be provided on both a side of the plurality of the holographic optical segments facing towards the user's eye and a side of the plurality of display segments facing towards the user's eye.

The beam expansion unit may comprise at least one optical component. The optical component may include a plurality of semi-reflecting surfaces. Each semi-reflecting surface may be plane. The semi-reflecting surfaces may be arranged mutually parallel and equidistantly. Each semi-reflecting surface may be arranged declined with respect to optical axes of the holographic optical elements by a declination angle. The declination angle is, for example, about 45°. Each semi-reflecting surface is adapted to act as a beam splitter, for example, by use of optical coatings. Each semi-reflecting surface may be adapted to only semi-reflect visible light emitted by the display segments or the display pixel units and else is transparent for visible light.

The semi-reflecting surfaces may be arranged to split a light beam, which enters the optical component, into a bundle of parallel light beams that propagate within a bundle plane. In particular, the semi-reflecting surfaces may be arranged to split the light beam entering the optical component such that a semi-reflecting surface splits the light beam into a transmitted light-beam and a reflected light beam, the transmitted light beam leaving the optical component and the reflected light beam being conveyed within the optical component along a conveying direction and then further being split by an adjacent semi-reflecting surface again into a transmitted light-beam leaving the optical component and a reflected light-beam being conveyed within the optical component along the conveying direction to a next semi-reflecting surface and so forth. The propagation direction of the transmitted light-beams and the conveying direction of the reflected light-beams span the bundle plane. The conveying direction thus represents an expansion direction, along which the bundle of split beams is expanded. Therefore, the semi-reflecting surfaces of the optical component may be arranged such that the bundle plane and the expansion direction of the optical component may be arbitrarily oriented. This allows expanding the eye box of the display device.

The beam expansion unit may comprise a first optical component having a first bundle plane and a first expansion direction and a second optical component having a second bundle plane and a second expansion direction, wherein the first bundle plane is parallel to the second bundle plane and/or first expansion direction and the second expansion direction are diametrically opposed. The first optical component and the second optical component may be arranged such that light beams, which are deflected by holographic optical elements, directly enter either the first optical component or the second optical component. This allows expanding the eye box of the display device in one dimension.

The beam expansion unit may comprise a first optical component having a first bundle plane and a first expansion direction and a second optical component having a second bundle plane and a second expansion direction, wherein the first bundle plane is perpendicular to the second bundle plane and/or first expansion direction is perpendicular to the second expansion direction. This allows expanding the eye box of the display device in two dimensions. The first optical component and the second optical component may be arranged such that light beams, which are deflected by holographic optical elements, directly enter the first optical component, wherein the bundle of parallel beams split by the first optical component subsequently enters the second optical component for further splitting.

In other words: The display device may comprise an optical component including a plurality of first semi-reflecting surfaces. The optical component may be provided on both a side of the plurality of the holographic optical segments facing towards the user's eye and a side of the plurality of display segments facing towards the user's eye. The first semi-reflecting surfaces may be arranged mutually parallel. Each first semi-reflecting surface may be arranged declined with respect to optical axes of the holographic optical elements, for example by about 45°. The first semi-reflecting surfaces are adapted to split a light beam, which is deflected by a holographic optical element, into a bundle of parallel light beams that propagate within a first plane. This allows an expansion of the exit pupil in a direction corresponding to a one-dimensional increasing of the size of the eye box. The optical component may additionally include a plurality of second semi-reflecting surfaces. The plurality second semi-reflecting surfaces are provided on a side of the plurality of the first semi-reflecting surfaces facing towards the user's eye. The second semi-reflecting surfaces are adapted to split a light beam, which is deflected by a first semi-reflecting surface, into a bundle of parallel light beams, which propagate within a second plane that is non-parallel to the first plane. This not only allows an expansion of the exit pupil along one direction within the first plane, but also an expansion of the exit pupil along one direction within the first plane corresponding to a two-dimensional increasing of the size of the eye box.

The see-through member represents, for example, a substrate, a viewing port, a window, a visor, a glass, an eyepiece, an eyeglass, a corrective lens, a windshield and/or a spectacle lens of the display device. The see-through member may be made of glass or plastic. The see-through area, for example, is a part, a section, a region or an area of the see-through member, through which a user views through the see-through member during a proper use of the display device. The see-through area and/or the see-through zone may be transparent and/or translucent for the whole visible light spectrum. In other words: Visible light may pass through the see-through area and/or the see-through zone without being scattered, reflected, refracted, deflected and/or absorbed.

The plurality of display segments can be arranged upon or inside the see-through member and/or the see-through area. For example, arranging the plurality of display segments inside the see-through member allows for a protection of the display segments against physical impact such as scratching. The arrangement of the plurality of display segments may be realized by fixing, gluing, bonding, welding, or printing as a circuit.

The holographic optical element may be a holographic concave mirror (i.e. a reflection hologram of concave mirror). In particular, the holographic concave mirror is a reflective, concave and parabolic mirror (i.e. a reflection hologram of a reflective, concave, and parabolic mirror). Such a holographic optical element allows arranging the display segment associated with the holographic optical element on a side of the holographic optical element facing towards an eye of a user, who views properly through the see-through head or helmet display device. The holographic optical element may have rotationally symmetric imaging properties, for example, by being the reflection hologram of a rotationally symmetric, concave, parabolic mirror.

A holographic optical element may be adapted to deflect (i.e. reflect or refract) visible light only within a deflection spectrum and to be transparent for visible light within a transmission spectrum, wherein the deflection spectrum and the transmission spectrum are spectrally disjoint. In other words: Each of the deflection spectrum and the transmission spectrum only cover a respective spectral section of the visible light spectrum and the deflection spectrum and the transmission spectrum do not overlap. This can be realized by holographically recording the holographic optical element using visible light only within the deflection spectrum. Such a holographic optical element is only refractive or reflective for visible light within deflection spectrum. Visible light within the transmission spectrum, in turn, passes through the holographic optical element without being refracted, reflected and/or absorbed by holographic optical element. Visible light representing an image of the physical world outside the display device is thus not or only slightly affected by the presence of the holographic optical element.

A display segment may be adapted to emit visible light only within an emission spectrum. In particular, the display segment may be adapted such that the emission spectrum includes an emission band spectrum with a limited emission bandwidth. The emission band spectrum may include a red color. The wavelength of the red color may be, for example, around 630 nm. However, any other color is conceivable, such as green or blue. The emission bandwidth of the emission band spectrum may be limited, for example, to around 30 nm or smaller. Such a display segment allows for creating a mono-chromatic image.

In particular, a display segment may be adapted to emit visible light only within a deflection spectrum of the holographic optical element associated with the display segment. In other words: An emission spectrum of the display segment may be completely covered by the deflection spectrum of the associated holographic optical element such that the whole emission spectrum of the display segment is refracted or reflected by the associated holographic optical element.

The plurality of pixels units of a display segment may be provided in the focal plane of the holographic optical element associated with the display segment. Within the display segment, the plurality of pixel units may be provided in a rhombus-shaped, rectangular-shaped, or square-shaped manner across a respective two-dimensional pixel array. The pixel array may lie in a plane or curved pixel arrangement area. The pixel arrangement area may be imaginary or a surface of the see-through member. The pixel arrangement area may coincide with an arrangement area for arranging the plurality of display segments.

A display system may comprise two display devices. This allows employing one display device for each eye of the user. Hence, dual eye observation and/or the creating of 3D (virtual) images is possible.

Throughout this description, when referring to a feature characterizing an element of a plurality of elements, each of the plurality of elements may be characterized by the corresponding feature.

Figure 2:
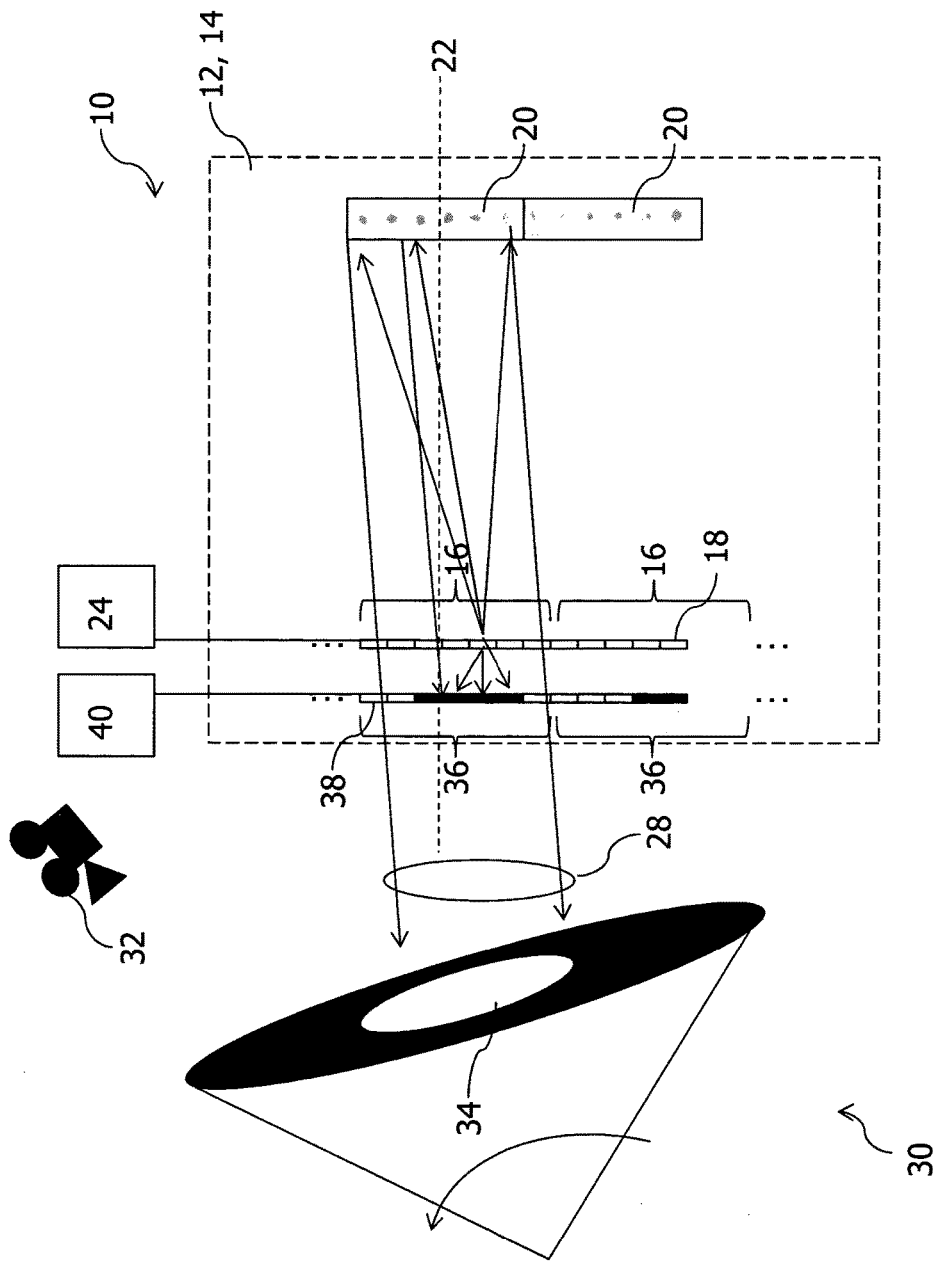
Figure 3A:
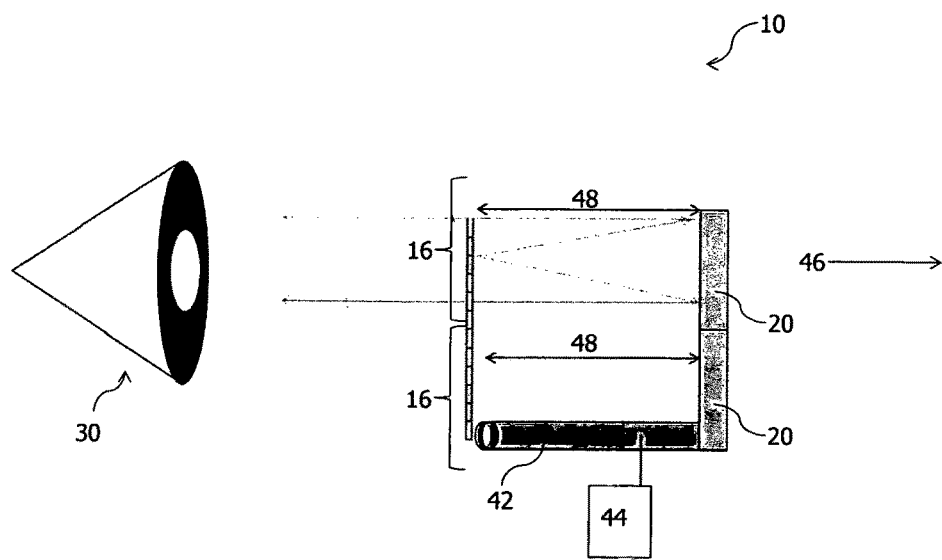
Figure 3B:
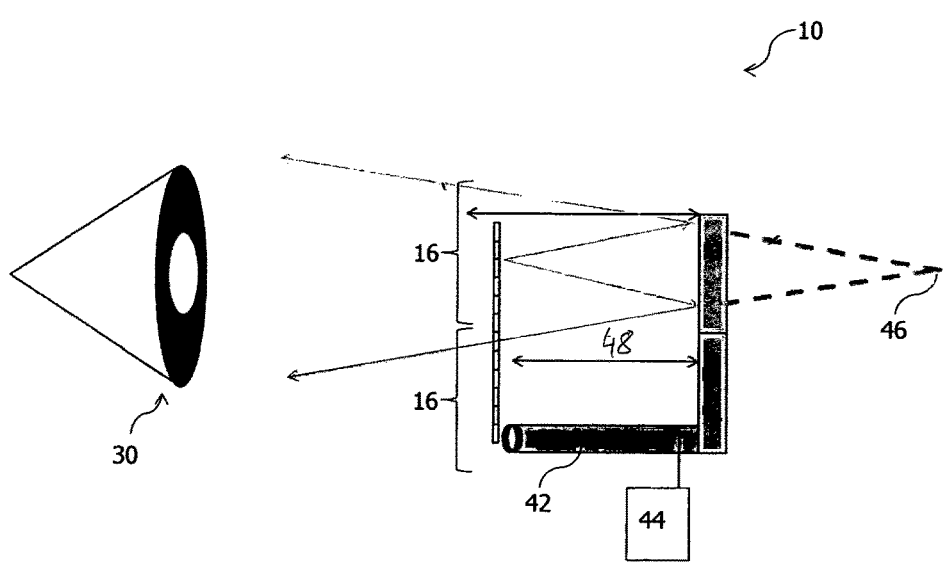
Figure 4:
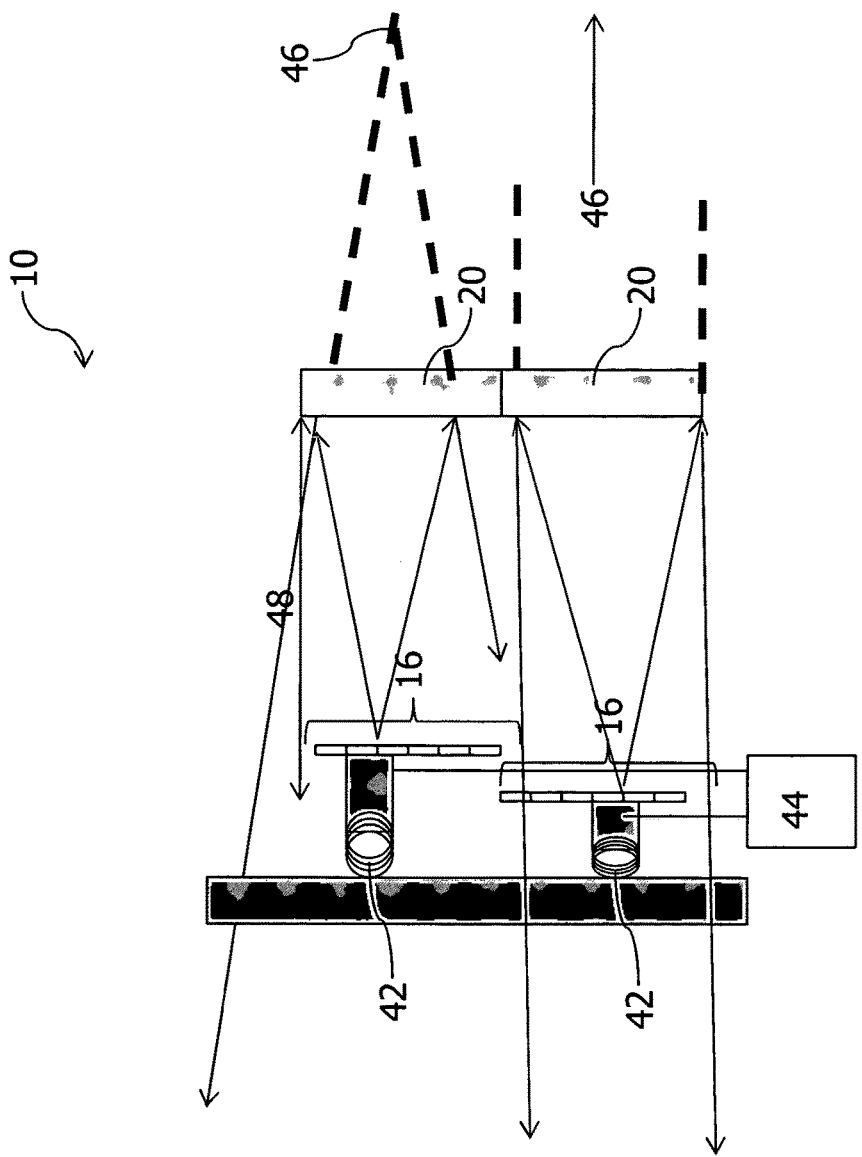
Figure 5:
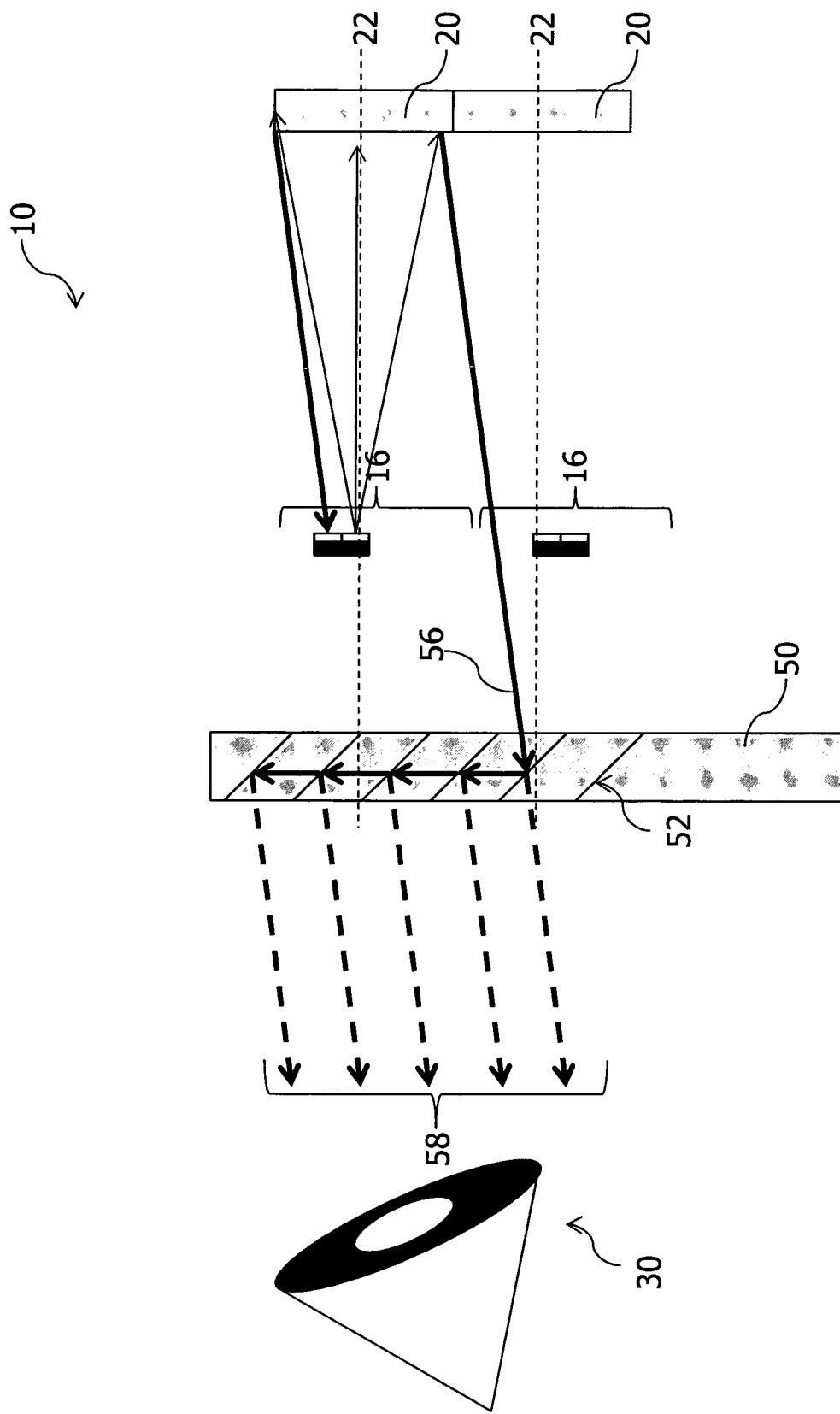
Figure 6:
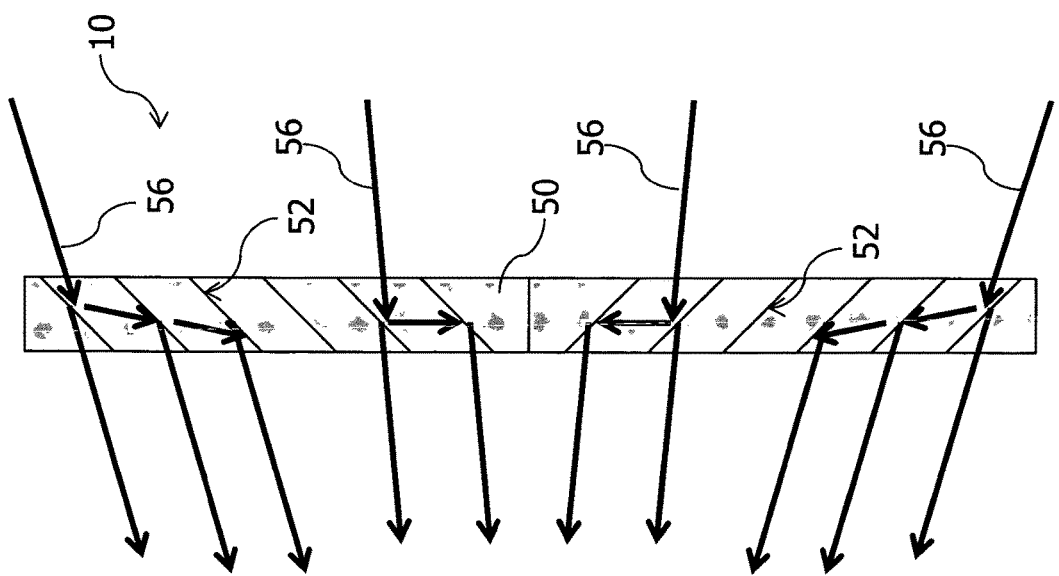
Figure 6:
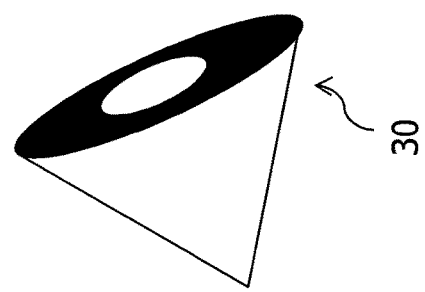
Figure 7:
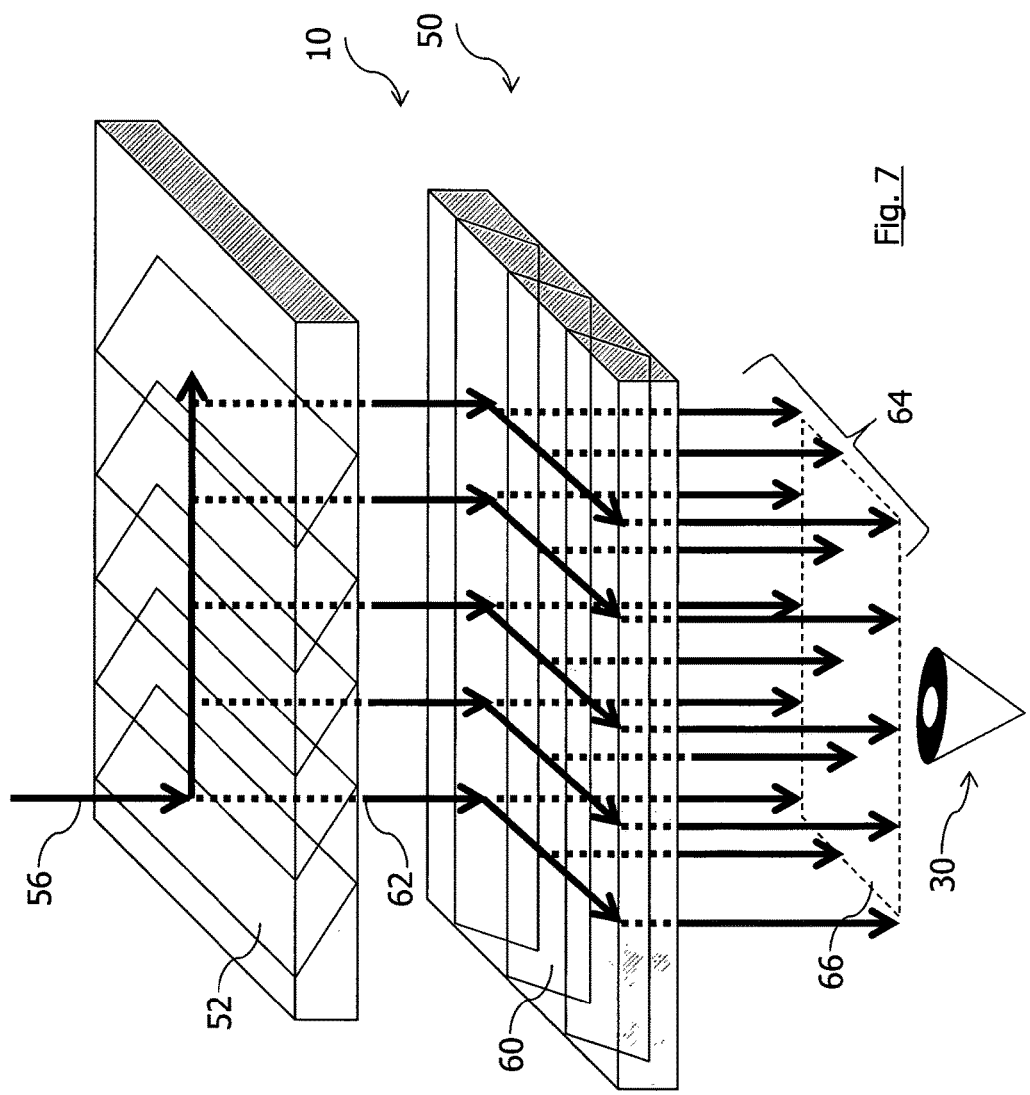

The invention will be elucidated further in the following on the basis of the appended drawings, of which:

FIG. 1 shows schematically a first example of a display device, wherein a display segment displays a display image in a first display image position, FIG. 2 shows schematically the display device of FIG. 1, wherein the display segment displays the display image in a second display image position spatially shifted from the first display image position, FIGS. 3*a*, 3*b* show schematically a second example of a display device with an actuator for shifting a plurality of display segments in a direction away from or towards to a plurality of holographic optical elements, FIG. 4 shows schematically a third example of a display device with a plurality of actuators for shifting each display segment of plurality of display segments in a direction away from or towards to a plurality of holographic optical elements individually, FIG. 5 shows schematically a fourth example of a display device with an optical component including a plurality of semi-reflecting surfaces, FIG. 6 shows schematically another example of the optical component of FIG. 5, FIG. 7 shows schematically still another example of the optical component of FIG. 5.

In FIGS. 1 and 2 a display device 10 is shown. The display device 10 comprises a see-through member 12 having a see-through area 14. The see-through member 12 includes a plurality of display segments 16. Exemplarily, only two display segments 16 are shown in the figures. Further display segments 16 are indicated by dots.

Each display segment 16 is adapted to emit visible light (indicated by arrows in the figures). The plurality of display segments 16 is provided within the see-through area 14 in a mutually spaced manner.

To this end, each display segment 16 includes a plurality of transparent or substantially transparent display pixel units 18. Each display pixel unit 18 is transparent or substantially transparent for visible light. For example, each display pixels unit 18 is a transparent OLED.

Each display pixel unit 18 is adapted to emit visible light in an on-state and to emit no visible light in an off-state. In FIGS. 1 and 2 display pixel units 18 in the on-state are shown in grey, whereas display pixels units 18 in the off-state are shown in white.

The see-through member 12 further includes a plurality of holographic optical elements 20 provided within the see-through area 14. Each holographic optical element 20 is associated with a respective display segment 16. In FIGS. 1 and 2, each display segment 16 is located in a focal plane of the associated holographic optical element 20. Each holographic optical element 20 is adapted to deflect (i.e. to reflect, to refract, to re-direct or the like) the visible light emitted by the associated display segment 16. In particular, as shown for example in FIGS. 1 and 2, each holographic optical element 20 is adapted to collimate the visible light emitted by the associated display segment 18 when the display segment is located in a focal plane of the associated holographic optical element 20. The plurality of holographic optical elements 20 thus represents a collimating optical system of the display device 10.

The display pixel units 18 are provided in a mutually spaced manner such that the display pixel units 18 are arranged at different distances from an optical axis 22 of the holographic optical element 20 associated with the display segment 16. As shown schematically in side-view in FIGS. 1 and 2, the display pixel units 18 of a display segment 16 are provided equidistantly along a straight line within a plane. The display pixel units 18, which are in their on-state at a specific time, form a display image. Therefore, each display segment 16 can be regarded as a micro display for displaying such a display image.

As each display pixel unit 18 is transparent or substantially transparent for visible light, visible light can pass through each display segment 16. Hence, the display segment 16 itself is transparent or at least substantially transparent. Therefore, the display segments 16 allow visible light to pass through the see-through member 12. Moreover, as the plurality of the display segments 16 form the display of the display device 10, both visible light emitted by the display itself and visible light from the physical world can pass through the display. Hence, the display as a whole is transparent or at least semi-transparent. Therefore, it is possible to provide the display directly in the line of sight or in the field of view of the user, who uses the display device 10. Only the plurality of holographic optical elements 20 is mandatory, however, an additional conveying optical system for conveying visible light emitted by the display into the line of sight or the field of view is dispensable. This, in turn, allows a lightweight and compact design of the display device 10.

As shown in FIGS. 1 and 2, the display device 10 comprises a display segment controller 24 for controlling the on- and off-states of the display pixel units 18 of each display segment 16 to display a display image on the display segment 16. In other words: The display segment controller 24 can change each display segment 16 from displaying the display image in the first display image position to displaying the display image in the second display image position, thereby moving (i.e. spatially shifting) the display image within the display area of the display segment 16. This allows moving the display image with respect to the holographic optical element 20 associated with the display segment 16.

In particular, the display segment controller 24 is adapted to display the display image in a first display image position (as shown in FIG. 1) or in a second display image position (as shown in FIG. 2). The display segment controller 24 is adapted to display the display image in the first display image position or in the second display image position spatially shifted from the first display image position such that the visible light of the display image in the first display image position is deflected by the holographic optical element 20 associated with the display segment 18 to pass through a first exit pupil 26 (as shown in FIG. 1) and the visible light of the display image in the second display image position is deflected by the holographic optical element 20 associated with the display segment 16 to pass through a second exit pupil 28 (as shown in FIG. 2). The position of the center of the second exit pupil 28 is spatially shifted with respect to the position of the center of the first exit pupil 26, as can be seen by comparing FIGS. 1 and 2. Therefore, the display segment controller 24 can adjust the position of an exit pupil 26, 28 of the display device 10, through which the visible light emitted by the display pixel units 18 in the display segments 16 is leaving the display device 10 in the direction to a user's eye 30. This allows setting the position of the exit pupil 26, 28 to an arbitrary predetermined position.

As shown in FIGS. 1 and 2, the display device 10 further comprises an image capturing device 32 for capturing an image of a pupil 34 of a user's eye 30 and for generating a position signal representing a position of the pupil 34 of the user's eye 30. Therefore, the image capturing device 32 allows tracking the position of the pupil 34 of the user's eye 30. In this sense, the image capturing device 32 can be regarded as an eye tracker.

As illustrated in FIGS. 1 and 2, the display segment controller 24 is be adapted to display the display image in each display segment 16 in a display image position based on the position signal generated by the image capturing device 32 such that the visible light of the display image in this display image position is deflected by the holographic optical element 20 associated with the display segment 16 to pass through an exit pupil 26, 28, the position of which coincides with the position of the pupil 34 of the user's eye 30. This allows setting the position of the exit pupil 26, 28, through which the visible light emitted by the display pixel units 18 in the display segments 16 are leaving the display device 20 in the direction to the user's eye 30, to the position of the pupil 34 of the user's eye 30. One further advantage of this concept is that the user's eye 30 receives at any time the visible light emitted by the display segments 16 even when moving. Another advantage of this concept is that the setting the position of the exit pupil 26, 28 to the position of the pupil 34 of the user's eye 30 does not require any mechanically moving parts, but is controlled electronically/optically.

As shown in FIGS. 1 and 2, the display device also comprises a plurality of liquid crystal display (LCD) segments 36. Each LCD segment 36 is associated with a respective display segment 16 and includes a plurality of LCD pixel units 38. In particular, each LCD pixel unit 38 of an LCD segment 36 is opaque or substantially opaque for visible light emitted by the associated display segment 16 in an on-state and transparent or substantially transparent for visible light emitted by the associated display segment 16 in an off-state. In FIGS. 1 and 2 LCD pixel units 38 in the on-state are shown in grey, whereas LCD pixels units 38 in the off-state are shown in white. The LCD pixel units 38 are provided in a mutually spaced manner such that the LCD pixel units 38 are arranged at different distances from the optical axis 22 of the holographic optical element 20 associated with the LCD segment 16. As shown schematically in side-view in FIGS. 1 and 2, the LCD pixel units 38 are provided equidistantly along a straight line within a plane.

This allows realizing each LCD segment 36 as a micro LCD for displaying an LCD image. Therefore, the LCD segments 36 can be used to shape arbitrarily formed masks absorbing visible light.

Further shown in FIGS. 1 and 2, the display device 10 also comprises an LCD segment controller 40 for controlling the on- and off-states of the LCD pixel units 38 of each LCD segment 36 to display an LCD image on the LCD segment 36. In particular, the LCD segment controller 40 is adapted to display the LCD image in a first LCD image position (as shown in FIG. 1) or in a second LCD image position (as shown in FIG. 2), which is spatially shifted from the first LCD image position. More particular, the LCD segment controller 40 is adapted to display the LCD image based on the position signal generated by the image capturing device 32 such that the LCD image in the first LCD image position absorbs visible light of the display image of the associated display segment 16 in a first display image position to prevented the visible light from directly passing from the display segment 16 through a first exit pupil 26 (as shown in FIG. 1) and such that the LCD image in the second LCD image position absorbs visible light of the display image of the associated display segment 16 in a second display image position to prevented the visible light from directly passing from the display segment 16 through a second exit pupil 28 (as shown in FIG. 2). In other words: The LCD segment controller 40 can be adapted to associate each display image position of a display image displayed by the display segment 16 with a respective LCD image position of an LCD image displayed by the associated LCD segment 36. This allows for realizing for each display segment 16 a spatially variable and arbitrarily shaped mask such that the display segment 16 is prevented from directly emitting visible light towards the user's eye 30.

The display device 10 as shown in FIGS. 3a and 3b comprises an actuator 42 for shifting the plurality of display segments 16 in a direction away from or towards to the plurality of holographic optical elements 20. The display device 10 further comprises an actuator controller 44 for controlling the actuator 42 such that the position of a virtual image 46 created by the visible light emitted by the display segments 16 is adjustable with respect to a position of the position of a user's eye 30. This allows arranging the plurality of display segments 16 as a whole in the focal planes of the holographic optical elements 20. Therefore, it is possible to change the distance 48 between the plurality of display segments 16 and the plurality of holographic optical elements 20. Consequently, it is possible to change the focus plane of the virtual images 46 created by the display segments 16 and the holographic optical elements 20. In FIG. 3a the position of a virtual image 46 is adjusted to be at infinity (indicated by the arrow). In FIG. 3b the position of a virtual image 46 is image at a finite distance, because the display segments 16 and the display pixel units 18 are not anymore at the focal distance of the holographic optical element 20. The focal distance of the holographic optical elements 20 is indicated by 49.

The display device 10 as shown in FIG. 4 comprises a plurality of actuators 42, each actuator 42 being associated with a respective display segment 16 for shifting the display segment 16 in a direction away from or towards to the holographic optical element 20 associated with the display segment 16. The display device 10 further comprises a actuator controller 44 for controlling the plurality of actuators 42 such that the position of a virtual image 46 created by the visible light emitted by each display segment 16 is adjustable individually with respect to a user's eye 30. This allows arranging each display segment 16 in the focal plane of the associated holographic optical element 20 individually. Therefore, it is possible to change the distance 48 between each display segment 16 and its respective holographic optical element 20 separately. Consequently, it is possible to create a virtual image 46 having a specific depth of field.

As shown in FIGS. 5, 6 and 7, the display device comprises an optical component 50 including a plurality of first semi-reflecting surfaces 52. The optical component 50 is provided on both a side of the plurality of the holographic optical segments 20 facing towards the user's eye 30 and a side of the plurality of display segments 16 facing towards the user's eye 30. The first semi-reflecting surfaces 52 are arranged mutually parallel. Each semi-reflecting surface is arranged declined with respect to optical axis 22 of the holographic optical elements 20 by 45°. Each semi-reflecting surface 52 is adapted to act as a beam splitter.

The semi-reflecting surfaces 52 are adapted to split a light beam 56, which is deflected by a holographic optical element 20, into a bundle of parallel light beams 58 that propagate within a first plane. This allows an expansion of the exit pupil in a direction corresponding to a one-dimensional increasing of the size of the eye box 58.

As shown in FIG. 7, the optical component additionally includes a plurality of second semi-reflecting surfaces 60. The plurality second semi-reflecting surfaces 60 are provided on a side of the plurality of the first semi-reflecting surfaces 52 facing towards the user's eye 30. The second semi-reflecting surfaces 60 are adapted to split a light beam 62, which is deflected by a first semi-reflecting surface 52, into a bundle of parallel light beams 64, which propagate within a second plane that is non-parallel to the first plane. This not only allows an expansion of the exit pupil along one direction within the first plane, but also an expansion of the exit pupil along one direction within the first plane corresponding to a two-dimensional increasing of the size of the eye box 66.

Each holographic optical element 20 is a holographic concave mirror (i.e. a reflection hologram of concave mirror). In particular, the holographic concave mirror is a reflective, concave and parabolic mirror (i.e. a reflection hologram of a reflective, concave, and parabolic mirror). Such a holographic optical element 20 allows arranging the display segment 16 associated with the holographic optical element 20 on a side of the holographic optical element 20 facing towards an eye of a user 30, who views properly through the display device 10. Each holographic optical element 20 is adapted to deflect (i.e. reflect or refract) visible light only within a deflection spectrum and to be transparent for visible light within a transmission spectrum, wherein the deflection spectrum and the transmission spectrum are spectrally disjoint. Each display segment 16 is adapted to emit visible light only within a deflection spectrum of the holographic optical element 20 associated with the display segment 16.

Unless expressly stated otherwise, identical reference symbols in the Figures stand for identical or identically-acting elements. Also, an arbitrary combination of the features and/or modifications elucidated in the Figures in connection with individual embodiments is conceivable.

The invention claimed is:

1. A display device, comprising:
   a see-through member having a see-through area; and
   a display segment controller,
   the see-through member including a plurality of display segments for emitting visible light, each of the plurality of display segments being provided within the see-through area in a mutually spaced manner, the see-through member further including a plurality of holographic optical elements provided within the see-through area, each of the plurality of holographic optical elements being associated with a respective display segment, wherein each of the plurality of holographic optical elements is adapted to collimate the visible light emitted by the associated display segment when the display segment is located in a focal plane of the associated holographic optical element, wherein each display segment includes a plurality of substantially transparent display pixel units provided in a mutually spaced manner such that each of the plurality of display pixel units is arranged at different distances from an optical axis of the holographic optical element associated with the display segment, wherein each of the plurality of display pixel units is adapted to emit visible light in an on-state and to emit no visible light in an off-state, wherein the display segment controller is adapted to control the on- and off-states of the plurality of display pixel units of each display segment to display a display image on the display segment, the display segment controller being adapted to move the display image within the display area of the display segment from a first display image position to a second display image position spatially shifted from the first display image position such that the visible light of the display image in the first display image position is deflected by the holographic optical element associated with the display segment to pass through a first exit pupil and the visible light of the display image in the second display image position is deflected by the holographic optical element associated with the display segment to pass through a second exit pupil, wherein the position of the first exit pupil is spatially shifted from the position of the second exit pupil.

2. The display device according to claim 1, further comprising:

an image capturing device for capturing an image of a pupil of a user's eye and for generating a position signal representing a position of the pupil of the user's eye, wherein the display segment controller is adapted to display the display image in each display segment in a display image position based on the position signal generated by the image capturing device such that the visible light of the display image in the display image position is deflected by the holographic optical element associated with the display segment to pass through an exit pupil, the position of which coincides with the position of the pupil of the user's eye.

3. The display device according to claim 1, further comprising a plurality of liquid crystal display segments, each of the plurality of liquid crystal display segments being associated with a respective display segment, wherein each of the plurality of liquid crystal display segments includes a plurality of LCD pixel units provided in a mutually spaced manner such that the plurality of LCD pixel units is arranged at different distances from an optical axis of the holographic optical element associated with the LCD segment, wherein each LCD pixel unit of an LCD segment is substantially opaque for visible light emitted by the associated display segment in an on-state and substantially transparent for visible light in an off-state.

4. The display device according to claim 3, further comprising:

an LCD segment controller for controlling the on- and off-states of the plurality of LCD pixel units of each LCD segment to display an LCD image on the LCD segment based on the position signal generated by the image capturing device, the LCD segment controller being adapted to display the LCD image in a first LCD image position or in a second LCD image position spatially shifted from the first LCD image position such that the LCD image in the first LCD image position absorbs visible light of a display image of the associated display segment in a first display image position to prevent the visible light from directly passing from the display segment through a first exit pupil and such that the LCD image in the second LCD image position absorbs visible light of the display image of the associated display segment in a second display image position to prevent the visible light from directly passing from the display segment through a second exit pupil.

5. The display device according to one of claim 1, further comprising:

an actuator for shifting the plurality of display segments in a direction away from or towards the plurality of holographic optical elements, and an actuator controller for controlling the actuator such that the position of a virtual image created by the visible light emitted by the display segments is adjustable with respect to a position of a user's eye.

6. The display device according to claim 1, further comprising:

a plurality of actuators, each of the plurality of actuators being associated with a respective display segment for shifting the display segment relative to the holographic optical element associated with the display segment; and an actuator controller for controlling the plurality of actuators such that the position of a virtual image created by the visible light emitted by each display segment is adjustable individually with respect to a user's eye.

7. The display device according to claim 1, further comprising:

an optical component including a plurality of first semi-reflecting surfaces, the optical component being provided on both a side of the plurality of the holographic optical elements facing towards the user's eye and a side of the plurality of display segments facing towards the user's eye, wherein the plurality of first semi-reflecting surfaces are arranged to split a light beam, which is deflected by a holographic optical element, into a bundle of parallel light beams, which propagate within a first plane.

8. The display device according to claim 7, the optical component further including a plurality of second semi-reflecting surfaces, the plurality second semi-reflecting surfaces being provided on a side of the plurality of the first semi-reflecting surfaces facing towards the user's eye, wherein the plurality of second semi-reflecting surfaces are arranged to split a light beam, which is deflected by a first semi-reflecting surface, into a bundle of parallel light beams, which propagate within a second plane that is non-parallel to the first plane.

* * * * *